UNITED STATES PATENT OFFICE.

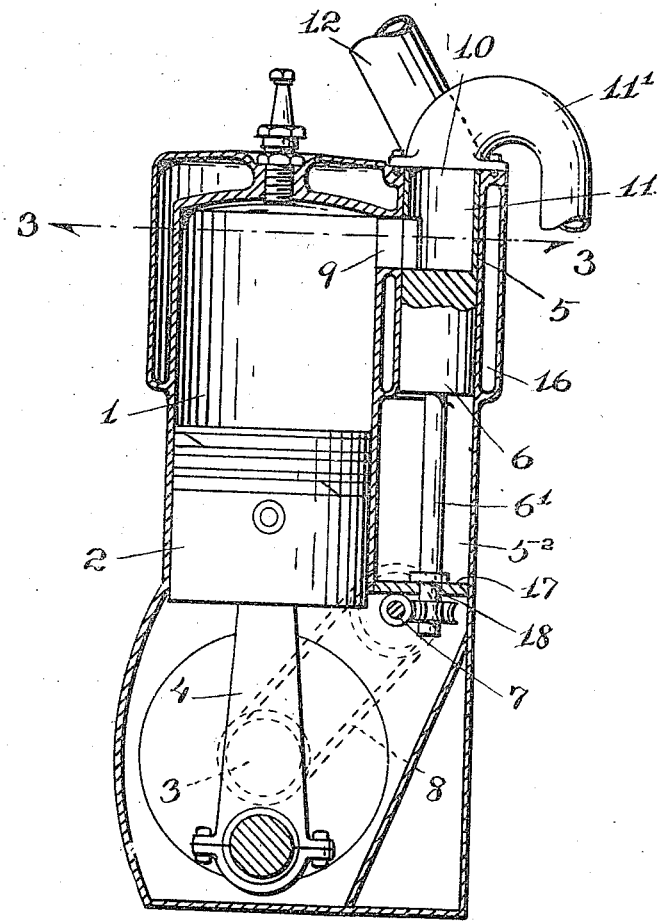

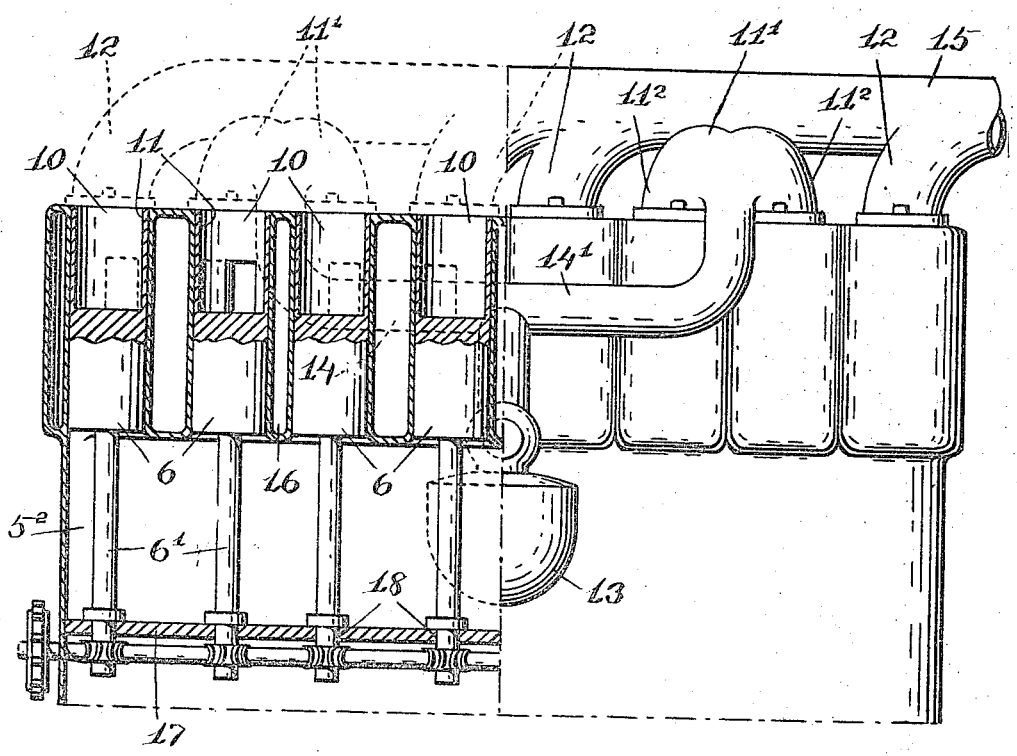
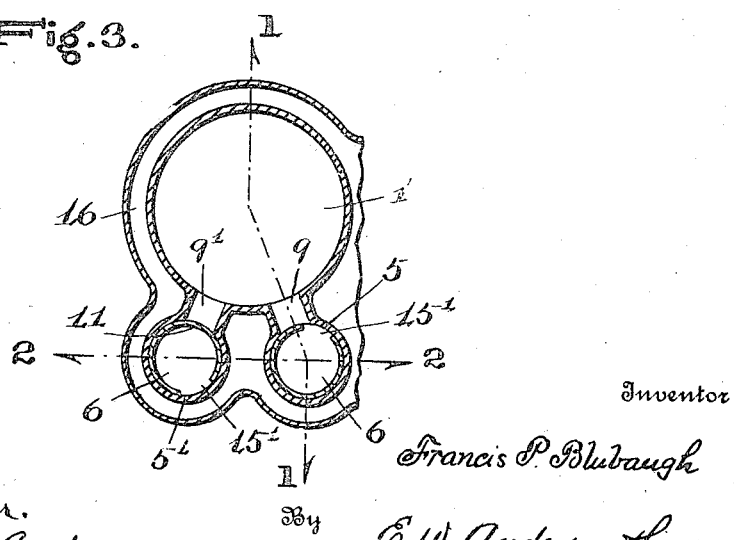

FRANCIS P. BLUBAUGH, OF FORT SCOTT, KANSAS.

ROTARY VALVE FOR EXPLOSIVE-ENGINES.

1,141,758. Specification of Letters Patent. Patented June 1, 1915.

Application filed March 20, 1915. Serial No. 15,916.

*To all whom it may concern:*

Be it known that I, FRANCIS P. BLUBAUGH, a citizen of the United States, resident of Fort Scott, in the county of Bourbon and State of Kansas, have made a certain new and useful Invention in Rotary Valves for Explosive-Engines; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a vertical transverse section of the engine on the line 1—1, Fig. 3, parts being broken away. Fig. 2 is a longitudinal section on the line 2—2 Fig. 3, parts being broken away. Fig. 3 is a horizontal section, on the line 3—3, Fig. 1.

The invention has relation to rotary valves for explosive engines, and it consists in the novel construction and combinations of parts, as hereinafter set forth.

In the accompanying drawings, illustrating the invention as applied to a four-cycle engine, the numeral 1 designates the working cylinder of the engine, 2 the working piston and 3 the crank shaft, having an operating rod connection 4 with said piston.

Each cylinder is provided at one side with adjacent cylindrical valve chambers 5, 5', for inlet and exhaust respectively, and in each valve chamber works a rotary cylindrical valve 6, having means for turning the same, preferably worm gear 7, provided with a chain connection 8 with the shaft 3, the valve being thereby turned once around for each two revolutions of the crank shaft.

The valve chambers arranged in pairs are provided one with an inlet opening 9 to the cylinder and the other with an exhaust opening 9' leading from the cylinder. Each valve is open at one end at 10, and has a cylindrical side wall 11 in which an inlet or exhaust opening 15 or 15' is provided. The inlet pipe 11' has connection with the open end of the inlet valve, and the exhaust pipe 12 has connection with the open end of the exhaust valve.

The working cylinders connected up in multiple, as in fours, are provided with a carbureter 13, with which the inlet pipe has connection, said inlet pipe having oppositely extending branches 14, 14', each branch being subdivided as at 11² and leading to the adjacent inlet valves of adjacent working cylinders. The exhaust valves of said adjacent cylinders are located upon the outside of the adjacent inlet valves, being connected with a single exhaust main 15 by the pipes 12.

The inlet and exhaust pipe connections with the open ends of the valves are located at substantially right-angles to each other, the intake extending upwardly and curving over the top of the valve to which it leads.

The worm gear 7 for each valve comprises a vertical valve shaft 6', located in a chamber 5² below the valve chamber and provided with a horizontal partition 17 between the same and the crank chamber, said shaft having journal bearings in a perforation 18 of said partition, and carrying at its lower end the worm gear, whereby any surplus oil from the valves will drain into the crank chamber.

The water-jacket for the working cylinder and valve cylinders is shown at 16.

My engine is of simple construction, the valves are inclosed and silent in their operation. The engine is easy running and the valves capable of rapid operation without undue wear, whereby the power of the engine is increased and the vibration thereof lessened, the intake and exhaust having both free passage. The parts being surrounded by efficient water jackets, the valves are prevented from becoming unduly heated.

What I claim is:

In an explosive engine, a crank chamber, parallel adjacent valve chambers, a lower chamber below the valve chamber and having a partition between the same and said crank chamber, parallel rotary valves in said valve chambers provided respectively with inlet and exhaust openings in the lateral walls thereof, said valves having open upper ends, and shafts located in said lower chamber and having journal bearings in said partition, inlet and exhaust conduits communicating with the open ends of said valves, and driving connections between the crank shaft and the shafts of the rotary valves, including worm gearing and a sprocket chain connection between the crank shaft and the worm shaft.

In testimony whereof I affix my signature, in presence of two witnesses.

FRANCIS P. BLUBAUGH.

Witnesses:
CHAS. BLUBAUGH,
L. N. SUTTON.